United States Patent
Von Dahl et al.

(10) Patent No.: US 10,393,549 B2
(45) Date of Patent: Aug. 27, 2019

(54) DETERMINING A POSITION OF A MOVABLE ELEMENT OF A LINEAR ACTUATOR WHICH IS INTENDED FOR A MOTOR VEHICLE

(71) Applicant: AUDI AG, Ingolstadt (DE)

(72) Inventors: Andreas Von Dahl, Ingolstadt (DE); Carl Johannes Schlockermann, München (DE)

(73) Assignee: AUDI AG, Ingolstadt (DE)

( * ) Notice: Subject to any disclaimer, the term of this patent is extended or adjusted under 35 U.S.C. 154(b) by 268 days.

(21) Appl. No.: 15/523,884

(22) PCT Filed: Oct. 31, 2015

(86) PCT No.: PCT/EP2015/002187
§ 371 (c)(1),
(2) Date: May 2, 2017

(87) PCT Pub. No.: WO2016/070982
PCT Pub. Date: May 12, 2016

(65) Prior Publication Data
US 2017/0350727 A1    Dec. 7, 2017

(30) Foreign Application Priority Data
Nov. 3, 2014   (DE) .................. 10 2014 016 189

(51) Int. Cl.
*G01D 5/20* (2006.01)
*B60T 1/00* (2006.01)
(Continued)

(52) U.S. Cl.
CPC ............... *G01D 5/20* (2013.01); *B60T 1/005* (2013.01); *G01D 5/2013* (2013.01);
(Continued)

(58) Field of Classification Search
CPC .... G01D 5/12; G01D 5/14; G01D 5/20–2291; B60T 1/005; G01R 31/06
See application file for complete search history.

(56) References Cited

U.S. PATENT DOCUMENTS

| | | | |
|---|---|---|---|
| 5,399,952 A | 3/1995 | van Alem et al. | |
| 5,442,671 A * | 8/1995 | Wollschlager | G01D 5/2013 324/207.11 |

(Continued)

FOREIGN PATENT DOCUMENTS

| | | |
|---|---|---|
| CN | 1464972 A | 12/2003 |
| CN | 100405122 C | 7/2008 |

(Continued)

OTHER PUBLICATIONS

International Search Report dated Jan. 19, 2016 by the European Patent Office in International Application PCT/EP2015/002187.
(Continued)

*Primary Examiner* — Huy Q Phan
*Assistant Examiner* — David B Frederiksen
(74) *Attorney, Agent, or Firm* — Henry M. Feiereisen LLC

(57) ABSTRACT

A method for determining a position of a movable element of a linear actuator of a motor vehicle includes supplying a current to a coil of the linear actuator so as to move and/or hold the movable element by a magnetic field of the coil generated by the supplied current; modulating the current supplied to the coil with an electrical alternating variable having a predetermined frequency; determining an impedance or an admittance of the coil at the predetermined frequency by measuring a further variable at the predetermined frequency; and determining the position of the movable element as a function of the determined impedance or admittance.

20 Claims, 2 Drawing Sheets

(51) Int. Cl.
*F01L 9/04* (2006.01)
*H01F 7/18* (2006.01)
*F01L 13/00* (2006.01)

(52) U.S. Cl.
CPC ............. *F01L 2009/0469* (2013.01); *F01L 2013/0052* (2013.01); *F01L 2013/11* (2013.01); *H01F 2007/185* (2013.01)

(56) References Cited

U.S. PATENT DOCUMENTS

| | | | | |
|---|---|---|---|---|
| 5,481,187 | A * | 1/1996 | Marcott | F16D 48/064 324/207.16 |
| 5,583,434 | A | 12/1996 | Moyers et al. | |
| 6,208,377 | B1 * | 3/2001 | Morofuji | G02B 27/646 348/208.3 |
| 6,469,500 | B1 * | 10/2002 | Schmitz | B60G 17/01933 123/90.11 |
| 7,483,253 | B2 * | 1/2009 | Schumacher | H01F 7/1805 361/160 |
| 2001/0043450 | A1 * | 11/2001 | Seale | F01L 9/04 361/160 |
| 2007/0029955 | A1 * | 2/2007 | Kanekawa | H03M 1/485 318/144 |
| 2008/0105565 | A1 * | 5/2008 | Davalos | B03C 5/005 205/775 |
| 2009/0241872 | A1 * | 10/2009 | Wang | F01L 9/04 123/90.11 |
| 2015/0330466 | A1 | 11/2015 | Masuda et al. | |
| 2016/0274060 | A1 * | 9/2016 | Denenberg | G01N 27/9046 |

FOREIGN PATENT DOCUMENTS

| | | | |
|---|---|---|---|
| CN | 104011991 A | 8/2014 | |
| DE | 691 11 889 | 4/1996 | |
| DE | 102 29 689 | 1/2004 | |
| DE | 10 2010 032 443 | 7/2011 | |
| DE | 102010032443 A1 * | 7/2011 | .......... G01D 5/2013 |
| WO | WO 2014/088001 | 6/2014 | |

OTHER PUBLICATIONS

Chinese Search Report dated Jan. 23, 2019 with respect to counterpart Chinese patent application 2015800593936.
Translation of Chinese Search Report dated Jan. 23, 2019 with respect to counterpart Chinese patent application 2015800593936.

* cited by examiner

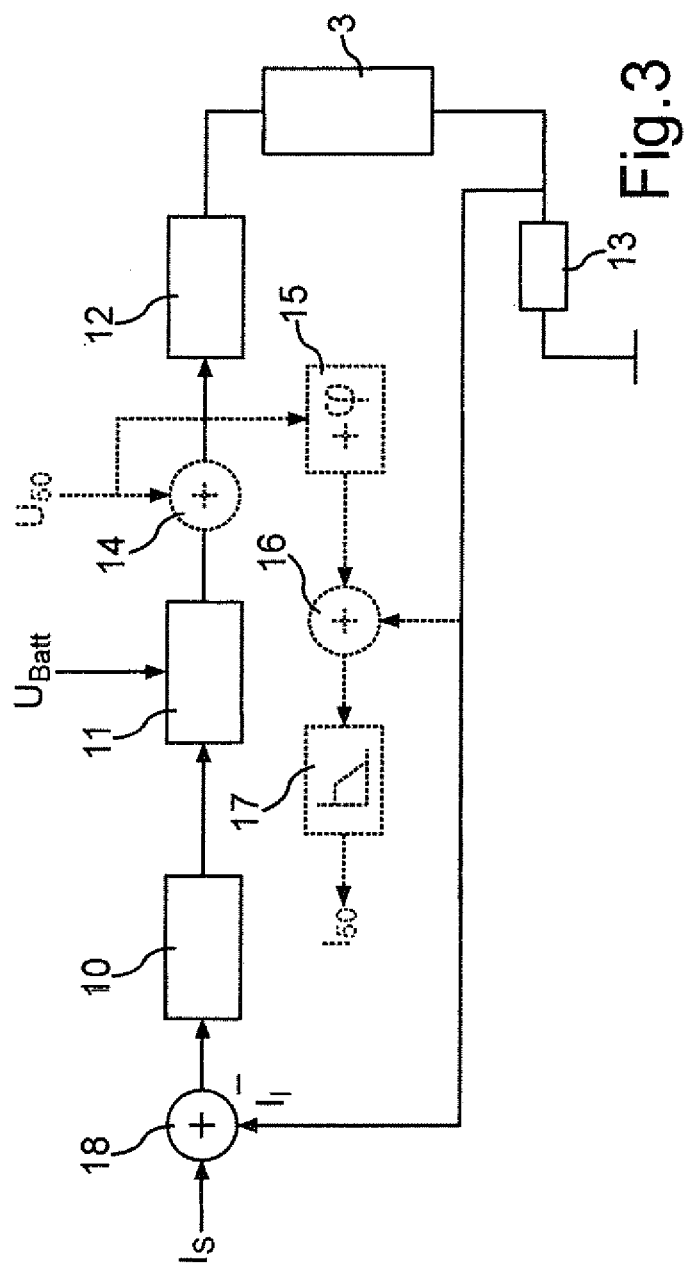

DETERMINING A POSITION OF A MOVABLE ELEMENT OF A LINEAR ACTUATOR WHICH IS INTENDED FOR A MOTOR VEHICLE

CROSS-REFERENCES TO RELATED APPLICATIONS

This application is the U.S. National Stage of International Application No. PCT/EP2015/002187, filed Oct. 31, 2015, which designated the United States and has been published as International Publication No. WO 2016/070982 and which claims the priority of German Patent Application, Serial No. 10 2014 016 189.7, filed Nov. 3, 2014, pursuant to 35 U.S.C. 119(a)-(d).

BACKGROUND OF THE INVENTION

The invention relates to a method for determining a position of a movable element of a linear actuator for a motor vehicle, wherein the movable element is movable by means of a magnetic field of a coil of a linear actuator and the determination of the position of the movable element is based on a change of an impedance of the coil. The invention also relates to a linear actuator for a motor vehicle with an electric coil, a movable element which is movable by means of a magnetic field of the coil of the linear actuator and with a control unit which is configured to determine a position of the movable element based on a change of an impedance of the coil.

Generally, knowing a coil current which is supplied to a linear actuator, for example a holding magnet for moving and/for holding a movable element, for example an anchor of the holding magnet and a force of the linear actuator that is proportionate thereto, allows determining when the movable element reaches a predetermined position. However, in order to accomplish this under conditions in which the movability of the movable element is influenced by further factors, for example by a temperature-dependent viscosity of an oil in which the movable element moves, the force acting on the linear actuator and with this the coil current would have to be adjusted to the influences of the further factors. For example the coil current could be controlled as a function of the temperature. Another possibility is to determine the position of the movable element independent of the coil current supplied for the moving and/or holding the movable element. For this purpose for example additional sensors can be used. However there are also methods that measure an anchor position of a magnetic anchor of the actuator via a change of the impedance or inductivity of the coil. These methods are based either on detecting a time constant of an increase or decrease of the coil current or, if the coil current is controlled by means of pulse width modulation, measuring the inductivity via the amplitude of the coil current at the frequency of the pulse width modulation.

SUMMARY OF THE INVENTION

It is an object of the present invention to simplify the determination of a position of a movable element of a linear actuator for a motor vehicle. This object is solved by the devices of the two independent patent claims. Advantageous embodiments are set forth in the dependent claims, the figures and the description of the figures.

The invention includes a method for determining a position of a movable element of a linear actuator for a motor vehicle. Hereby the movable element is movable by means of a magnetic field of an electric coil of the linear actuator. The linear actuator and the movable element can for example be a holding magnet and an assigned anchor. The position of the movable element relative to the coil is determined based on a change of an impedance or inductivity or an admittance of the coil. The linear actuator and the movable element are thus configured so that a change of the position of the movable element changes the impedance or admittance of the coil. Impedance and admittance are equivalent in the context of the invention. In the following the term impedance also includes impedance and admittance. The change of the impedance or admittance via movement of the movable element can for example be accomplished via a variable gap arranged in the coil made of a material having a permeability which differs from the remaining material in the magnetic circuit of the coil, wherein the gap changes its dimensions in dependence on the position of the movable element relative to or in the coil. The materials for the gap with which the gap is filled can be materials such as air, oil water or the like. In order to simplify the determination of the position a coil current which is supplied to the coil for moving or holding the movable element is first modulated with an electrical alternating variable of a constant predetermined frequency. The modulating can be performed by superimposing or impinging a voltage, which causes the coil current, with an alternating voltage, which then corresponds to the electrical alternating variable. In a next step the impedance is determined at a predetermined frequency by measuring a further variable, in particular a further electrical variable.

In addition to the static coil current the system can thus be impinged with an electrical alternating variable, in particular a voltage U or a current I. The electrical response of the coil system according to $U/\text{komp}\{Z\}=I$ at the predetermined frequency and optionally its harmonic waves is measured with appropriate means and converted, for example by a demodulation, into a further variable which reflects the changes of the impedance Z. The further variable can be an electrical variable or a different variable; for example in the case of a demodulation, which is digitally performed in a processor, the electrical variable can be a process-oriented variable. When the alternating variable of the predetermined frequency is an alternating voltage the further variable can for example be an amplitude of the portion of a voltage which is proportional to the coil current of the predetermined frequency.

The position of the movable element is then determined from the determined impedance, which is present at the predetermined frequency. This is performed for example by comparing the determined impedance with a comparison value, which in particular corresponds to a known position of the movable element. As an alternative the position can be linearly detected via a determination of a transfer function between the anchor position and the further variable.

This has the advantage that no additional sensors are required for determining the position of the movable element. The method can also be realized very easily in terms of circuitry, requires only a low computing effort and places low demands on signal processing and signal acquisition. Thus the method can be implemented with conventional hardware components that are generally already used for linear actuators and which are already present or already integrated in the linear actuator. In addition the method does not require a special geometry of the linear actuator. Expensive materials that are optimized with regard to magnetic properties are not required. In addition the underlying effect is very pronounced so that the resulting signal, in the present case a change of the impedance at a predetermined frequency, can be easily measured. The determination of the position is thus simpler than in known methods.

In a preferred embodiment it is provided that the linear actuator is used as a locking device with the movable element as a locking element. This may in particular be implemented as a part of a parking lock of a motor vehicle transmission. This has the advantage that a locking device is realized in a particularly simple mariner, which meets increased safety demands because the position of the movable element can be verified also under the influence of further influences that are hard to control. This is especially desirable in the case of a parking lock of a motor vehicle transmission because such a parking lock on one hand strictly requires a reliable locking while on the other hand a changing viscosity of the transmission oil in dependence on temperature, wear and further factors are influences that act on the locking device that cannot be controlled.

In a further embodiment it is provided that the predetermined frequency is predetermined in dependence on the concrete embodiment of the linear actuator, i.e., in particular the coil and the magnetic circuit assigned to the coil. Here, the geometry of the linear actuator, i.e., the coil and the magnetic circuit, the materials used in the magnetic circuit and their magnetic properties and as a consequence the occurring magnetic losses play a role for the appropriate choice of the predetermined frequency. In order to predetermine the predetermined frequency the difference of the impedance of the coil is determined for different positions of the movable element at different frequencies and a frequency with the greatest possible difference of the impedance, i.e., the greatest possible impedance contrast, is predetermined in the different positions of the movable element. The difference can be determined empirically by measuring or also theoretically by computation or simulation. Hereby in particular further conditions, for example limits of components used in an associated control device, can be taken into account. This has the advantage that the predetermined frequency is adjusted to the concrete configuration of the linear actuator and with this the coil and the magnetic circuit and the position of the movable element can be determined particularly easily and reliably.

In a particularly advantageous embodiment it is provided that as predetermined frequency for the alternating variable a frequency between 10 and 1000 Hz, in particular between 25 and 200 Hz is selected. Particularly preferred are here frequencies in the range between 50 and 150 Hz. This has the advantage that in the said frequency range the impedance of the coil is subject to particularly significant changes, while in other frequency ranges either ohmic losses or hysteresis losses dominate the impedance. Correspondingly the voltage, which is proportionate to the coil current, changes in dependence on the position of the movable element particularly strongly at these frequencies so that the position can be determined easily.

In a further embodiment it is provided that the coil current is modulated by the alternating variable by a value between 0.1 percent, in particular between 1 and 20 percent, further preferably by a value between 5 and 15 percent. When the coil current of the coil is supplied by a pulse width modulation, which has a higher frequency compared to the predetermined frequency, this can be accomplished via a modulation of the duty cycle of the pulse width modulation. This has the advantage that the alternating voltage is sufficiently great to enable easy determination of a voltage which is proportionate to the coil current at this predetermined frequency of the alternating voltage, at the same time however the alternating voltage does not influence the holding and/or moving of the movable element.

In an advantageous embodiment it is provided that the further variable, in particular electrical variable, is controlled with a sampling frequency or time slice of less than 1000 Hz, in particular with a sampling frequency of less than 250 Hz. In particular in this case the predetermined frequency is selected to be below the Nyquist-limit of the sampling frequency. This has the advantage that the method can for example also be performed with a control circuit, made of inexpensive and robust components, for example microcontrollers. Especially in the case of such a control circuit such a sampling frequency, which is slow compared to a higher frequency pulse width modulation, is usually already present. Influences of the higher frequency pulse width modulation can thus also be filtered out particularly easily and cost-effectively by a low pass filtering. In particular the method can thus be realized in a potentially already present control circuit of a simple software or firmware adjustment.

In a preferred embodiment it is provided that the impedance is determined at the predetermined frequency according to the functional principle of a correlation and/or lock-in-amplifier. This can of course in particular be performed directly by a correlation amplifier or a lock-in-amplifier. In the simplest way this can be realized by multiplication and averaging. This has the advantage that the impedance at the predetermined frequency can be determined particularly accurately and as a result also changes of the impedance, which represent a change of the position of the movable element, can be measured particularly accurately. Thus the position of the movable element can be determined particularly accurately in a particularly simple manner.

According to a further embodiment the position of the movable element is determined at the predetermined frequency from a phase and/or an imaginary part and/or an absolute value and/or a real part of the impedance. Because depending on the concrete configuration of the linear actuator and the used electronics components the phase, the imaginary part and the absolute value depend particularly strongly on the position of the movable element, the position of the movable element can thus be particularly easily measured. In the case of a small phase, for example of 30 or less, the value of the impedance can be deduced with a sufficient accuracy for the real part so that then also the real part of the impedance is suitable for measuring the position of the movable element.

In a particularly advantageous embodiment it is provided that the determining of the position of the movable element from the impedance includes a low pass filtering of a signal, in particular by a simple rectangular filter or block filter, i.e., via a rectangular filter function. When in the context of the method a correlation or lock-in-amplifier is used the block filter can in particular be the associated low pass filter. A block filter corresponds here to a so-called boxcar-filter, which adds up a defined number of measuring values with equal weight. This has the advantage that the influence of the position of the movable element on the filtered proportionate voltage or a value dependent on the filtered voltage is amplified and the resulting low pass filtered signal can be analyzed more easily.

In particular it can be provided that the number of the values over which averaging is performed in the block filter is selected to be equal to an integer multiple of the quotient of a sampling frequency for the further, in particular electrical, variable and the predetermined frequency of the alternating variable. When for example a control circuit for the coil current operates with a sampling frequency of 200 Hz and the predetermined frequency of the electrical alternating variable is 50 Hz, then for example averaging is performed over multiples of 4, i.e., for example over 4, 8, 12 or 16 values. In this embodiment in particular the predetermined frequency of the alternating variable and the sampling frequency is selected so that the quotient is an integer. This has the advantage that a leakage effect or border effect of the block filter which as so-called spectral leakage blurs the filtered signal and a may complicate the determination of the position of the movable element from the determined impedance, can be avoided.

The invention also includes a linear actuator for a motor vehicle. The linear actuator has an electric coil, a movable element, which is movable by means of a magnetic field of the coil and a control unit, which is configured to determine a position of a movable element based on a change of the impedance. Hereby the control unit is configured to modulate a current supplied to the movable element for moving/ and or holding the movable element with an alternating variable of predetermined frequency, to determine an impedance at a predetermined frequency by measuring a further variable, in particular a further electrical variable, and to determine the position of the movable element from the determined impedance. The control unit can in particular include a control circuit with a proportional integral controller in order to supply the coil current to the coil. Advantages and advantageous embodiments correspond to the advantages and advantageous embodiments of the method.

In further advantageous embodiments the invention also includes a motor vehicle or a motor vehicle transmission with such a linear actuator.

All features and feature combinations mentioned in the description above and explained below in the description of the figures and/or shown in the figures by themselves may not only be used in the respectively stated combination but also in other combinations or by themselves without departing from the scope of the invention. Thus also embodiments of the invention are to be assumed included and disclosed which are not explicitly shown and explained in the figures but which may flow from and can be generated by separate feature combinations.

BRIEF DESCRIPTION OF THE DRAWING

Exemplary embodiments of the invention are explained in more detail by way of schematic drawings.

It is shown in.

In the figures eh same or functionally similar elements are provided with the same reference signs.

DETAILED DESCRIPTION OF PREFERRED EMBODIMENTS

Figure 1:
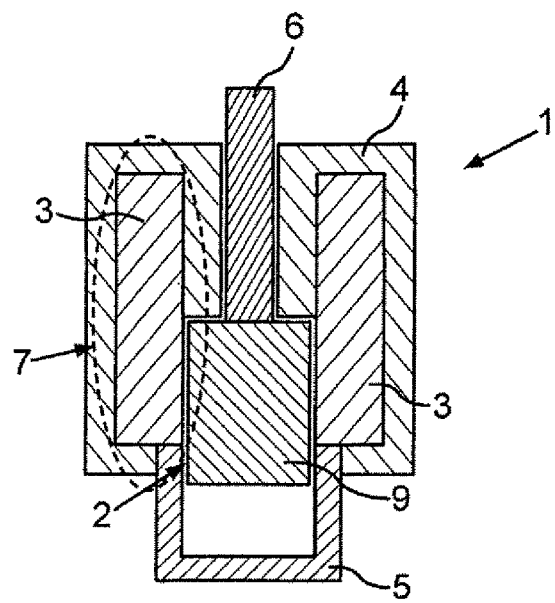
FIG. 1 a schematic sectional view of an exemplary embodiment of a linear actuator with an extended movable element.

FIG. 1 shows a sectional view of an exemplary embodiment of a linear actuator with an extended movable element. In the present case the linear actuator 1 is configured as a locking device. A movable element 2, in the resent case a locking element, is at least partially arranged in the interior of a coil 3. In the present case the locking element has the shape of a cylinder for example having two regions of different magnetic permeability and in the present case also different diameters. A first region 6 of the movable element 2, here with a smaller diameter, is made of a nonmagnetic material with a permeability m=1, and a second region 9 of the movable element 2, here with a greater diameter made of a magnetic material with a permeability m>1. In the shown example on both ends of the cylindrical coil 3 a respective first stop element 4 and a second stop element 5 are arranged. In the present case the movable element 2 is in contact with the first stop element 4 and protrudes over the first stop element with the first region 6. The protruding end region 6 of the movable element 2 can here be used for locking. A potentially required return spring is not shown for reasons of simplicity.

In the shown example the first stop element 4 extends outside about the coil and in regions into the interior of the coil 3, wherein in the shown arrangement the remaining interior space of the coil 3 is occupied by the movable element 2. Correspondingly, in the present case a magnetic circuit 7 extends in the interior of the coil 3 through the first stop element 4 and the second region 9 of the movable element 2. The impedance or inductivity of the coil 3 in this example is correspondingly determined at an extended movable element 2 by the materials of the first stop element 4 and the second region 9 of the movable element 2.

Figure 2:
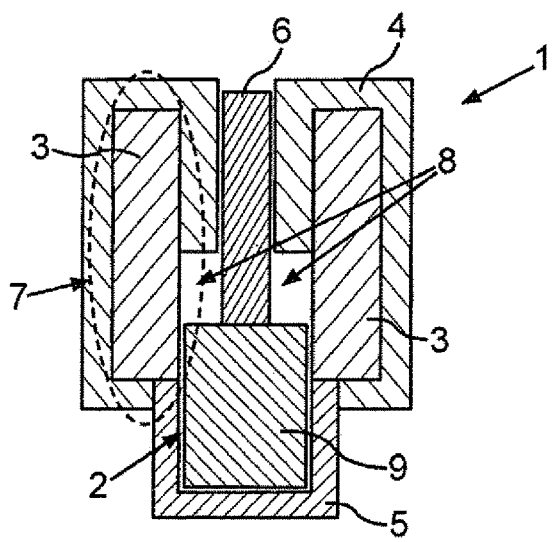
FIG. 2 a schematic representation of the linear actuator of FIG. 1 with a retracted movable element, and FIG. 3 a block diagram of a circuit which implements an exemplary embodiment of the method.

FIG. 2 shows a sectional view of the linear actuator shown in FIG. 1 with a retracted movable element. The first region 6 of the movable element now no longer protrudes over the first stop element 4 and the second region 9 of the movable element 2 is in engagement with the second stop element 5, which is here arranged on the coil side which is opposite the first stop element 4. Correspondingly an air gap or oil gap is now present at the inner side of the coil 3 between the first stop element 4 and the second region 9 of the movable element 2. This gap extends at least partially also in the region of the magnetic circuit 7 of the coil 3. Because the magnetic second region 9 of the movable element 2 no longer contacts the first stop element 4 the impedance or inductivity of the coil 3 is now no longer only influenced by the materials of the first stop element 4 and the movable element 2 but also by the air gap or oil gap 8, especially by its size dimensions. In the shown example a change of the impedance or inductivity of the coil 3 thus corresponds to a change of the position of the movable element 2 so that the position of the movable element 2 can be determined from a measured impedance or inductivity.

FIG. 3 shows a block diagram of an electronic circuit, which implements an exemplary embodiment of the method. The components indicated with solid lines correspond in this case to a known state of the art which was enhanced by the components shown in dashed lines and by corresponding process steps.

The components and processing steps shown in solid lines essentially form a standard control circuit. The a controller 10 which is for example configured as a PI-controller, receives as reference input variable the deviation from a setpoint coil current $I_S$ in the form of a reference signal, with which a magnetic field for moving and/or holding a movable element 2 (FIGS. 1 and 2) in a coil 3 is generated. In a further component 11 of the control circuit a disturbance variable, in this case the battery voltage $U_{batt}$ in the control circuit is compensated. In the present case thus a so-called forward correction is performed in the further component 11, in which also further processing steps can be performed. In the present embodiment between the coil 3, whose coil current is controlled by the control circuit, and the further component 11 a control component 12 is part of the control circuit, which control component impinges a coil current onto the coil 3 by means of a pulse width modulation via a mean voltage. The actual coil current $I_I$ is fed back in the control circuit as control variable. In the present case this occurs by determining a voltage that is proportionate to the actual coil current which is tapped at a grounded measuring resistance 13 and subtracted via an addition component 18 from the reference signal of the control circuit.

For determining the position of the movable element a modulation depth of the pulse width modulation is modified in a further summing member 14 by means of an alternating voltage with a predetermined frequency, which further summing member is integrated in the control circuit between the further component 11 and the control component 12. The coil current is thus modulated as a result of the alternating voltage with the predetermined frequency. In the shown embodiment the determining of the voltage that is proportionate to the coil current is accomplished at the predetermined frequency, i.e., at 50 Hz, as described below according to the principle of the correlation amplifier:

The alternating voltage $U_{50}$ is not only used to modify the modulation depth of the pulse width modulation but also to demodulate the voltage that is proportionate to the coil current at the predetermined frequency. For this purpose the alternating voltage $U_{50}$ is in this example first shifted in a phase shifting component 15 by a predetermined phase, for example 45 degrees. Because the predetermined frequency is known the phase shifting component 15 can in this case be configured as a simple time delay element. In a mixing component 16, for example configured as a so-called mixer, the voltage that is proportionate to the actual coil voltage $I_I$ is now demodulated with the phase-shifted alternating voltage $U_{50}$ for example by multiplication. In the present case following the demodulation or the multiplication is a tow pass filtering in a filter component 17 which in the present case is configured as a simple block filter or rectangular filter or as so-called boxcar-filter. The number of measuring values over averaging is performed in the filter component 17 in the present case is 16. The number is thus selected because the sampling frequency or the time slice of the controller 10 in this example is 200 Hz and the predetermined frequency is 50 Hz and the choice of an integer multiple of the quotient of the sampling frequency and predetermined frequency for the number of the measuring values has the advantage that interfering leakage effects of the low pass filter are minimized. As a result the voltage that is proportionate to the actual coil current $I_I$ is determined at the predetermined frequency of the alternating voltage $U_{50}$. This corresponds to determining the proportion $U_{50}$ of the actual current $I_I$ that can be attributed to the impinged alternating voltage $U_{50}$ and thus corresponds to determining the impedance of the coil 3 and the position of the movable element 2 (FIGS. 1 and 2). From the value of the proportionate voltage at the predetermined frequency, here 50 Hz, and with this the proportion $I_{50}$ of the actual coil current $I_I$ the position of the movable element can thus be determined for example by comparison with a respective comparison value which then represents a known position of the movable element.

What is claimed is:

1. A method for determining a position of a movable element of a linear actuator of a motor vehicle, comprising: supplying a current to a coil of the linear actuator so as to move and/or hold the movable element by a magnetic field of the coil generated by the supplied current;
modulating the current supplied to the coil with an electrical alternating variable having a predetermined frequency;
determining an impedance or an admittance of the coil at the predetermined frequency by measuring a further variable at the predetermined frequency; and
determining the position of the movable element as a function of the determined impedance or admittance,
wherein the predetermined frequency is predetermined in dependence on a concrete configuration of the linear actuator by determining a difference of the impedance of the coil for different positions of the movable element at different frequencies of the alternating variable and selecting a frequency with a greatest possible difference of the impedance in the different positions of the movable element as the predetermined frequency.

2. The method of claim 1, wherein the linear actuator is configured as a locking device, said movable element forming a locking element of the locking device.

3. The method of claim 2, wherein the locking device is constructed as a part of a parking lock of the motor vehicle.

4. The method of claim 1, wherein the predetermined frequency for the alternating variable is between 10 Hz and 1000 Hz.

5. The method of claim 1, wherein the predetermined frequency for the alternating variable is between 25 and 200 Hz.

6. The method of claim 1, wherein the predetermined frequency for the alternating variable is between 50 Hz and 150 Hz.

7. The method of claim 1, wherein the coil current is modulated by the alternating variable by a value between 0.1 percent and 25 percent.

8. The method of claim 1, wherein the coil current is modulated by the alternating variable by a value between 1 percent and 20 percent.

9. The method of claim 1, wherein the coil current is modulated by the alternating variable by a value between 5 and 15 percent.

10. The method of claim 1, wherein the further variable is controlled with a sampling frequency of less than 1000 Hz.

11. The method of claim 1, wherein the further variable is controlled with a sampling frequency of less than less than 250 Hz.

12. The method of claim 1, wherein the impedance is determined from the electrical alternating variable and the further variable at the predetermined frequency according to a functional principle of a correlation amplifier and/or a lock-in-amplifier.

13. The method of claim 1, wherein the impedance is determined from the electrical alternating variable and the further variable at the predetermined frequency by a correlation-amplifier or lock-in-amplifier.

14. The method of claim 1, wherein the position of the movable element is determined as a function of at least one of a phase, an imaginary part, an absolute value and a real part of the impedance at the predetermined frequency.

15. The method of claim 1, wherein the determination of the impedance includes a low pass filtering.

16. The method of claim 15, wherein the low pass filtering is performed by a rectangular filter.

17. The method of claim 16, further comprising averaging a number of values in the rectangular filter, said number being equal to an integer multiple of a quotient of a sampling frequency for the further variable and the predetermined frequency of the alternating voltage.

18. A linear actuator for a motor vehicle, said linear actuator comprising
an electric coil;
a movable element movable by a magnetic field of the electric coil; and
a control unit configured to determine a position of the movable element as a function of a change of an impedance or an admittance of the coil, said control unit being configured
to modulate a coil current supplied to the coil for moving and/or holding the movable element with an electrical alternating variable having a predetermined frequency;
to determine the impedance or the admittance at the predetermined frequency by measuring a further variable at the predetermined frequency; and
to determine the position of the movable element form the determined impedance or admittance,
wherein the predetermined frequency is predetermined in dependence on a concrete configuration of the linear actuator by determining a difference of the impedance of the coil for different positions of the movable element at different frequencies of the alternating variable and selecting a frequency with a greatest possible difference of the impedance in the different positions of the movable element as the predetermined frequency.

19. A motor vehicle transmission, comprising:
a linear actuator, said linear actuator comprising
an electric coil;
a movable element movable by a magnetic field of the electric coil; and
a control unit configured to determine a position of the movable element as a function of a change of an impedance or an admittance of the coil, said control unit being configured
to modulate a coil current supplied to the coil for moving and/or holding the movable element with an electrical alternating variable having a predetermined frequency;
to determine the impedance or the admittance at the predetermined frequency by measuring a further variable at the predetermined frequency; and
to determine the position of the movable element form the determined impedance or admittance,
wherein the predetermined frequency is predetermined in dependence on a concrete configuration of the linear actuator by determining a difference of the impedance of the coil for different positions of the movable element at different frequencies of the alternating variable and selecting a frequency with a greatest possible difference of the impedance in the different positions of the movable element as the predetermined frequency.

20. A motor vehicle, comprising:
a linear actuator, said linear actuator comprising
an electric coil;
a movable element movable by a magnetic field of the electric coil; and
a control unit configured to determine a position of the movable element as a function of a change of an impedance or an admittance of the coil, said control unit being configured
to modulate a coil current supplied to the coil for moving and/or holding the movable element with an electrical alternating variable having a predetermined frequency;
to determine the impedance or the admittance at the predetermined frequency by measuring a further variable at the predetermined frequency; and
to determine the position of the movable element form the determined impedance or admittance,
wherein the predetermined frequency is predetermined in dependence on a concrete configuration of the linear actuator by determining a difference of the impedance of the coil for different positions of the movable element at different frequencies of the alternating variable and selecting a frequency with a greatest possible difference of the impedance in the different positions of the movable element as the predetermined frequency.

* * * * *